(12) United States Patent
Snyder, II et al.

(10) Patent No.: US 9,811,467 B2
(45) Date of Patent: Nov. 7, 2017

(54) METHOD AND AN APPARATUS FOR PRE-FETCHING AND PROCESSING WORK FOR PROCESOR CORES IN A NETWORK PROCESSOR

(71) Applicant: Cavium, Inc., San Jose, CA (US)

(72) Inventors: Wilson Parkhurst Snyder, II, Holliston, MA (US); Richard Eugene Kessler, Northboroug, MA (US); Daniel Edward Dever, North Brookfield, LA (US); Nitin Dhiroobhai Godiwala, Boylston, KY (US)

(73) Assignee: Cavium, Inc., San Jose, CA (US)

( * ) Notice: Subject to any disclaimer, the term of this patent is extended or adjusted under 35 U.S.C. 154(b) by 379 days.

(21) Appl. No.: 14/171,290

(22) Filed: Feb. 3, 2014

(65) Prior Publication Data

US 2015/0220360 A1    Aug. 6, 2015

(51) Int. Cl.
*G06F 9/46* (2006.01)
*G06F 12/0862* (2016.01)
*G06F 12/0811* (2016.01)

(52) U.S. Cl.
CPC ...... *G06F 12/0862* (2013.01); *G06F 12/0811* (2013.01); *G06F 2212/1024* (2013.01); *G06F 2212/6028* (2013.01)

(58) Field of Classification Search
None
See application file for complete search history.

(56) References Cited

U.S. PATENT DOCUMENTS

| | | | | |
|---|---|---|---|---|
| 5,109,329 A * | 4/1992 | Strelioff | ............... | G06F 9/4843 710/261 |
| 6,003,114 A * | 12/1999 | Bachmat | ............ | G06F 12/0862 711/112 |
| 7,895,431 B2 * | 2/2011 | Bouchard | ............... | H04L 12/56 370/395.4 |
| 9,215,205 B1 * | 12/2015 | Smith | ................ | H04L 61/1511 |
| 2004/0054999 A1 * | 3/2004 | Willen | .................. | G06F 9/5044 718/103 |
| 2004/0268048 A1 * | 12/2004 | Homewood | ........ | G06F 12/0846 711/120 |
| 2005/0210472 A1 * | 9/2005 | Accapadi | ................ | G06F 9/505 718/105 |
| 2006/0056406 A1 * | 3/2006 | Bouchard | ............... | H04L 12/56 370/389 |
| 2006/0059310 A1 * | 3/2006 | Asher | ................. | G06F 9/30014 711/126 |
| 2008/0155197 A1 * | 6/2008 | Li | ......................... | G06F 9/4843 711/130 |
| 2008/0168259 A1 * | 7/2008 | Biran | ..................... | G06F 13/28 712/207 |
| 2008/0184233 A1 * | 7/2008 | Norton | ............... | G06F 9/45504 718/100 |
| 2008/0229070 A1 * | 9/2008 | Charra | .................... | G06F 9/383 712/207 |

(Continued)

*Primary Examiner* — Hiren Patel
(74) *Attorney, Agent, or Firm* — pkalousek.ip

(57) ABSTRACT

A method and a system embodying the method for pre-fetching and processing work for processor cores in a network processor, comprising requesting pre-fetch work by a requestor; determining that the work may be pre-fetched for the requestor; searching for the work to pre-fetch; and pre-fetching the found work into one of one or more pre-fetch work-slots associated with the requestor is disclosed.

13 Claims, 3 Drawing Sheets

(56) References Cited

U.S. PATENT DOCUMENTS

| | | | | |
|---|---|---|---|---|
| 2008/0244588 A1* | 10/2008 | Leiserson | G06F 9/4881 | 718/102 |
| 2008/0271030 A1* | 10/2008 | Herington | G06F 9/4881 | 718/104 |
| 2009/0198965 A1* | 8/2009 | Arimilli | G06F 9/30043 | 712/207 |
| 2009/0199190 A1* | 8/2009 | Chen | G06F 9/383 | 718/102 |
| 2011/0010480 A1* | 1/2011 | Auernhammer | G06F 12/0851 | 710/308 |
| 2011/0154346 A1* | 6/2011 | Jula | G06F 9/4881 | 718/103 |
| 2011/0161587 A1* | 6/2011 | Guthrie | G06F 12/0862 | 711/122 |
| 2011/0219195 A1* | 9/2011 | Habusha | G06F 12/08 | 711/137 |
| 2011/0225589 A1* | 9/2011 | Pirog | G06F 9/3851 | 718/102 |
| 2011/0228674 A1* | 9/2011 | Pais | H04L 49/90 | 370/235 |
| 2012/0066690 A1* | 3/2012 | Gupta | G06F 8/45 | 718/106 |
| 2012/0102501 A1* | 4/2012 | Waddington | G06F 9/5061 | 718/105 |
| 2012/0246406 A1* | 9/2012 | Bell | G06F 12/0831 | 711/119 |
| 2013/0103870 A1* | 4/2013 | Sanzone | G06F 13/1684 | 710/119 |
| 2013/0111000 A1 | 5/2013 | Kravitz et al. | | |
| 2013/0111141 A1* | 5/2013 | Kessler | G06F 12/08 | 711/130 |
| 2013/0254485 A1* | 9/2013 | Kannan | G06F 12/0862 | 711/122 |
| 2014/0129772 A1* | 5/2014 | Kalamatianos | G06F 12/0897 | 711/119 |
| 2014/0245308 A1* | 8/2014 | Moerman | G06F 9/4843 | 718/102 |
| 2014/0281390 A1* | 9/2014 | Boland | G06F 15/7825 | 712/207 |
| 2014/0282578 A1* | 9/2014 | Teller | G06F 9/5088 | 718/104 |
| 2014/0310467 A1* | 10/2014 | Shalf | G06F 15/7825 | 711/119 |
| 2014/0317356 A1* | 10/2014 | Srinivasan | G06F 12/0862 | 711/137 |
| 2015/0220872 A1* | 8/2015 | Snyder, II | G06Q 10/063114 | 705/7.15 |
| 2015/0222698 A1* | 8/2015 | Snyder, II | G06F 9/505 | 709/228 |
| 2016/0154677 A1* | 6/2016 | Barik | G06F 13/4239 | 718/105 |

* cited by examiner

US 9,811,467 B2

METHOD AND AN APPARATUS FOR PRE-FETCHING AND PROCESSING WORK FOR PROCESOR CORES IN A NETWORK PROCESSOR

BACKGROUND

1. Field

The present disclosure relates to network processor. More particularly, this invention is directed toward pre-fetching and processing work for processor cores in a network processor.

2. Description of Related Technology

A network processor is specialized processor, often implemented in a form of an integrated circuit, with a feature set specifically designed for processing packet data received or transferred over a network. Such packet data is transferred using a protocol designed, e.g., in accordance with an Open System Interconnection (OSI) reference model. The OSI defines seven network protocol layers (L1-7). The physical layer (L1) represents the actual interface, electrical and physical that connects a device to a transmission medium. The data link layer (L2) performs data framing. The network layer (L3) formats the data into packets. The transport layer (L4) handles end to end transport. The session layer (L5) manages communications between devices, for example, whether communication is half-duplex or full-duplex. The presentation layer (L6) manages data formatting and presentation, for example, syntax, control codes, special graphics and character sets. The application layer (L7) permits communication between users, e.g., by file transfer, electronic mail, and other communication known to a person of ordinary skills in the art.

The network processor may schedule and queue work, i.e., packet processing operations, for upper level network protocols, for example L4-L7, and being specialized for computing intensive tasks, e.g., computing a checksum over an entire payload in the packet, managing TCP segment buffers, and maintain multiple timers at all times on a per connection basis, allows processing of upper level network protocols in received packets to be performed to forward packets at wire-speed. Wire-speed is the rate of data transfer of the network over which data is transmitted and received. By processing the protocols to forward the packets at wire-speed, the network services processor does not slow down the network data transfer rate.

To improve network processor efficiency, multiple cores are scheduled to carry the processing via a scheduling, module. An example of such network processor may be found in U.S. Pat. No. 7,895,431, where the scheduling module is disclosed as a packet work order module.

However, with increasing frequency of the multiple processor cores, the amount of time spent in communicating with the scheduling module becomes an impediment to performance. Specifically, the latency between a processor asking for work and getting that work may be long, causing long latencies.

Accordingly, there is a need in the art for method and an apparatus, providing a solution to the above identified problems, as well as additional advantages.

SUMMARY

In an aspect of the disclosure, a method and an apparatus implementing the method for pre-fetching and processing work for processor cores in a network processor according to appended independent claims is disclosed. Additional aspects are disclosed in the dependent claims.

BRIEF DESCRIPTION OF THE DRAWINGS

The foregoing aspects described herein will become more readily apparent by reference to the following description when taken in conjunction with the accompanying drawings wherein.

Any unreferenced arrow or double-arrow line indicates a possible information flow between the depicted entities. An expression "_X" in a reference indicates an instance of an element of a drawing.

DETAILED DESCRIPTION

Unless otherwise defined, all terms (including technical and scientific terms) used herein have the same meaning as commonly understood by a person having ordinary skill in the art to which this invention belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Various disclosed aspects may be illustrated with reference to one or more exemplary configurations. As used herein, the term "exemplary" means "serving as an example, instance, or illustration," and should not necessarily be construed as preferred or advantageous over other configurations disclosed herein.

Various aspects of the present invention will be described herein with reference to drawings that are schematic illustrations of conceptual configurations of the present invention, unless explicitly noted. The various aspects of this disclosure are provided to enable a person having ordinary skill in the art to practice the present invention. Modifications to various aspects of a presented throughout this disclosure will be readily apparent to a person having ordinary skill in the art, and the concepts disclosed herein may be extended to other applications.

Figure 1:
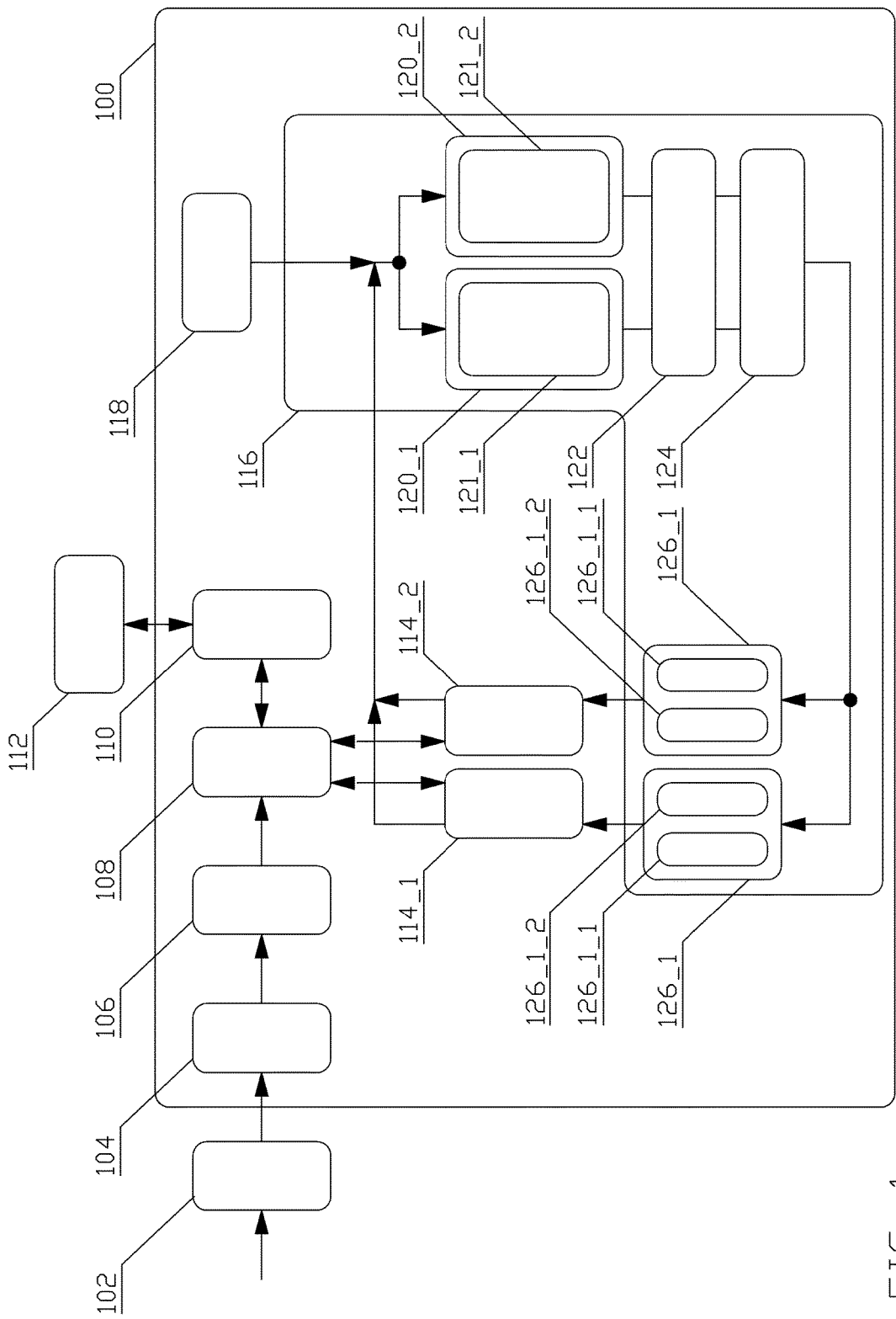
FIG. 1 depicts a conceptual structure of a network processor in accordance with an aspect of this disclosure.

FIG. 1 depicts a conceptual structure of a network processor 100. A packet is received over a network (not shown) at a physical interface unit 102. The physical interface unit 102 provides the packet to a network processor interface 104.

The network processor interface 104 carries out L2 network protocol pre-processing of the received packet by checking various fields in the L2 network protocol header included in the received packet. After the network processor interface 104 has performed L2 network protocol processing, the packet is forwarded to a packet input unit 106.

The packet input unit 106 performs pre-processing of L3 and L4 network protocol headers included in the received packet, e.g., checksum checks for Transmission Control Protocol (TCP)/User Datagram Protocol (UDP). The packet input unit 106 writes packet data into a level L2 cache 108 and/or a memory 112. A cache is a component, implemented as a block of memory for temporary storage of data likely to be used again, so that future requests for that data can be served faster. If requested data is contained in the cache (cache hit), this request can be served by simply reading the cache, which is comparatively faster. Otherwise (cache miss), the data has to be recomputed or fetched from its original storage location, which is comparatively slower. The memory 112 may comprise any physical device(s) used to store instructions and/or data on a temporary or permanent basis. Any type of memory known to a person skilled in the art is contemplated. In an aspect, the memory 112 is external to the network processor 100 and is accessed via a memory controller 110. The packet input unit 106 supports a programmable buffer size and can distribute packet data across multiple buffers to support large packet sizes.

Any additional work, i.e., another operation of additional packet processing, required on the packet data is carried out by a software entity executing on one or more processor cores 114. Although only two processor cores 114_1, 114_2 are shown, a person of ordinary skills in the art will understand that other number, including a single core is contemplated. Each of the one or more processor cores 114 is communicatively coupled to the L2 cache 108.

Work is scheduled by a Schedule, Synchronize, and Order (SSO) unit 116. Generally, work is a software routine or handler to be performed on some data. With regards to the SSO unit 116, work is a pointer to memory, where that memory contains a specific layout. In an aspect, the memory comprises the cache 108 and/or the memory 112. In an aspect, the layout comprises a work-queue entry storing the data and/or the instructions to be processed by the software entity executing on one or more of the processor cores 114, initially created by the packet input unit 106 or the software entity executing on each processor core 114. In an aspect, the work-queue entry may further comprise metadata for the work. In another aspect, the metadata may be stored in a work queue 122. In an aspect, the metadata may comprise a group-indicator, a tag, and a tag-type.

A person skilled in the art will appreciate that the SSO unit 116 comprises additional hardware units in addition to the hardware units explicitly depicted and described in FIG. 1 and associated text. Thus, reference to a step or an action carried out by the SSO unit 116 is carried out by one of such additional hardware units depending on a specific implementation of the SSO unit 116.

A group 120 comprises a collection of one of more work queues 121. Although only two groups are depicted, a person of ordinary skills in the art will understand that other number of groups is contemplated. Each group 121 is associated with at least one processor core 114. Consequently, when a software entity executing on the processor core 114 or the processor core 114 itself requests work, the arbitration does not need to be made for the groups 121 not associated with the processor core 114, improving performance. Although both the software entity and the processor core may be the requestor, in order to avoid unnecessary repetitiveness, in the reminder of the disclosure only the software entity is recited.

Because the number of the work queues is irrelevant for the subject-matter of this disclosure, only a single work queue, i.e., admission queue is shown for simplicity; however, in addition to the admission queue 121, the group 120 may further comprise other queues, e.g., a de-scheduled queue, a conflicted queue. Role of such queues is disclosed in a co-pending application Ser. No. 14/170,955, filed on Feb. 3, 2014, by Wilson P. Snyder II, et al., entitled A METHOD AND AN APPARATUS FOR WORK PACKET QUEUING, SCHEDULING, AND ORDERING WITH CONFLICT QUEUING.

The admission queue 121 may comprise at least one entry comprising work, and, optionally, also a tag, and tag-type to enable scheduling of the work to one or more processor cores 114; thus allowing different work to be performed on different processor cores 114. By means of an example, packet processing can be pipelined from one processor core to another, by defining the groups from which a processor core 114 will accept work.

A tag is used by the SSO unit 116 to order, schedule, and synchronize the scheduled work, according to the tag and a tag-type selected by the processor core 114. The tag allows work for the same flow (from a source to a destination) to be ordered and synchronized. The tag-type selects how the work is synchronized and ordered. There are three different tag-types. Ordered, i.e., work ordering is guaranteed, however, atomicity is not. Such a tag-type may be used during a de-fragmentation phase of packet processing, so that fragments for the same packet flow are ordered. Atomic i.e., work ordering and atomicity are guaranteed, in other words, when two work items have the same tag, the work must be processed in order, with the earlier work finishing before the later work can begin. Such a tag-type may be used for IPSec processing to provide synchronization between packets that use the same IPSec tunnel. Thus, IPSec decryption is carried out with atomic tag-type. Untagged, i.e., work ordering among the processor cores is not guaranteed, and the tag is not relevant with this tag-type. Such a tag may be used for processing different packet flows, which will likely have different tags, so will likely not be ordered and synchronized relative to each other, and can be executed completely in parallel on different processor cores 114.

Work queue entry may be created by hardware units, e.g., the packet input unit 106, in the memory 112. The add work request may then be submitted to the SSO unit 116 via an add-work entity 118. Alternatively, work queue entry may be created and add work request may be submitted by a software entity running at a processor core 114. In an aspect, work queue entry is created and add work request is submitted via the add-work entity 118 upon each packet arrival. In other aspects, work queue entry may be created upon completion of sending a packet, completion of compressing/decompressing data from a packet, and/or other events known to person of ordinary skills in the art.

Upon receiving the add work request, the SSO unit 116 adds the work, the tag, and the tag-type associated with the work into an admission queue 121 corresponding to the group 120 indicated by the add work request. In an aspect, the admission queue 121 may overflow to the cache 108 and/or the memory 112.

Software entity executing on processor cores 114, may request work from the SSO unit 116 via work-slot structures 126. The work-slot structure 126 comprises a memory. As disclosed supra, the work request indicates one or more groups associated with the processor cores 114; consequently, only those groups need to be arbitrated among. In response to the request, a get-work arbiter 122 arbitrates among the groups 120, associated with the requesting processor core 114, which have work in one of the admission queues 121, evaluates tags of the work at the top of the admission queue 121, selects one of the admission queues 121 and provides the work into the work-slot structure 126 corresponding to the requesting processor core 114 as disclosed in detail infra. Additionally, the get-work arbiter 122 provides the tag, and tag-type associated with the work to a memory, which is a part of a tag-chain manager interfacing the memory with other elements of the network processor 100. Any type of memory known to a person skilled in the art is contemplated. In an aspect, the memory comprises a Content Addressable Memory (CAM). The tag-chain manager 124 thus assists the SSO unit 116, to account for work that cannot be processed in parallel due to ordered or atomic requirements by keeping track of tags corresponding to the work being provided into the work-slot structure 126; therefore, knowing what work each processor core 114 is acting upon.

Each of the work-slots structures 126 comprises at least two work-slots 126_X_X. One of the work-slots, e.g., work-slot 126_1_1, in the work-slots structures 126_1, may contain the work that is presently pending in the corresponding processor core 114_1; another of the work-slots, e.g., work-slot 126_1_2 may contain the work that is pre-fetched for processing. commencing after the presently pending work, i.e., work in the work slot 126_1_2, is finished at the processor core 114_1. Consequently, the processor core 114_1 may commence processing the pre-fetched work immediately after completing processing of the presently pending work; thus avoiding or mitigating latencies. Although only one pre-fetched work-slot are shown, a person skilled in the art will understand that more than one pre-fetched work-slot is contemplated.

Figure 2A:
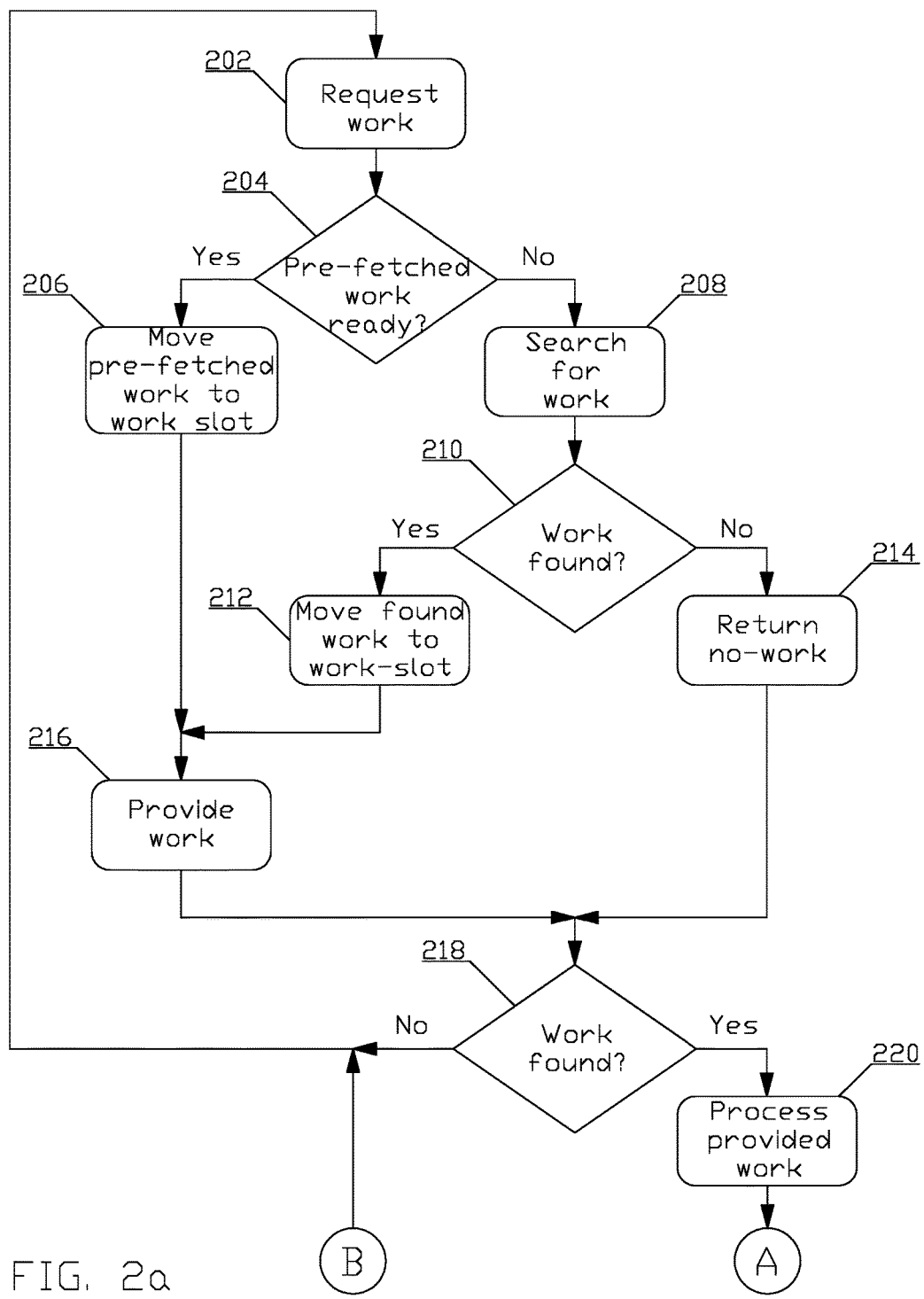
FIG. 2a depicts a first part of a flow chart enabling a process of pre-fetching and processing work for processor cores in a network processor in accordance with an aspect of this disclosure.
Figure 2B:
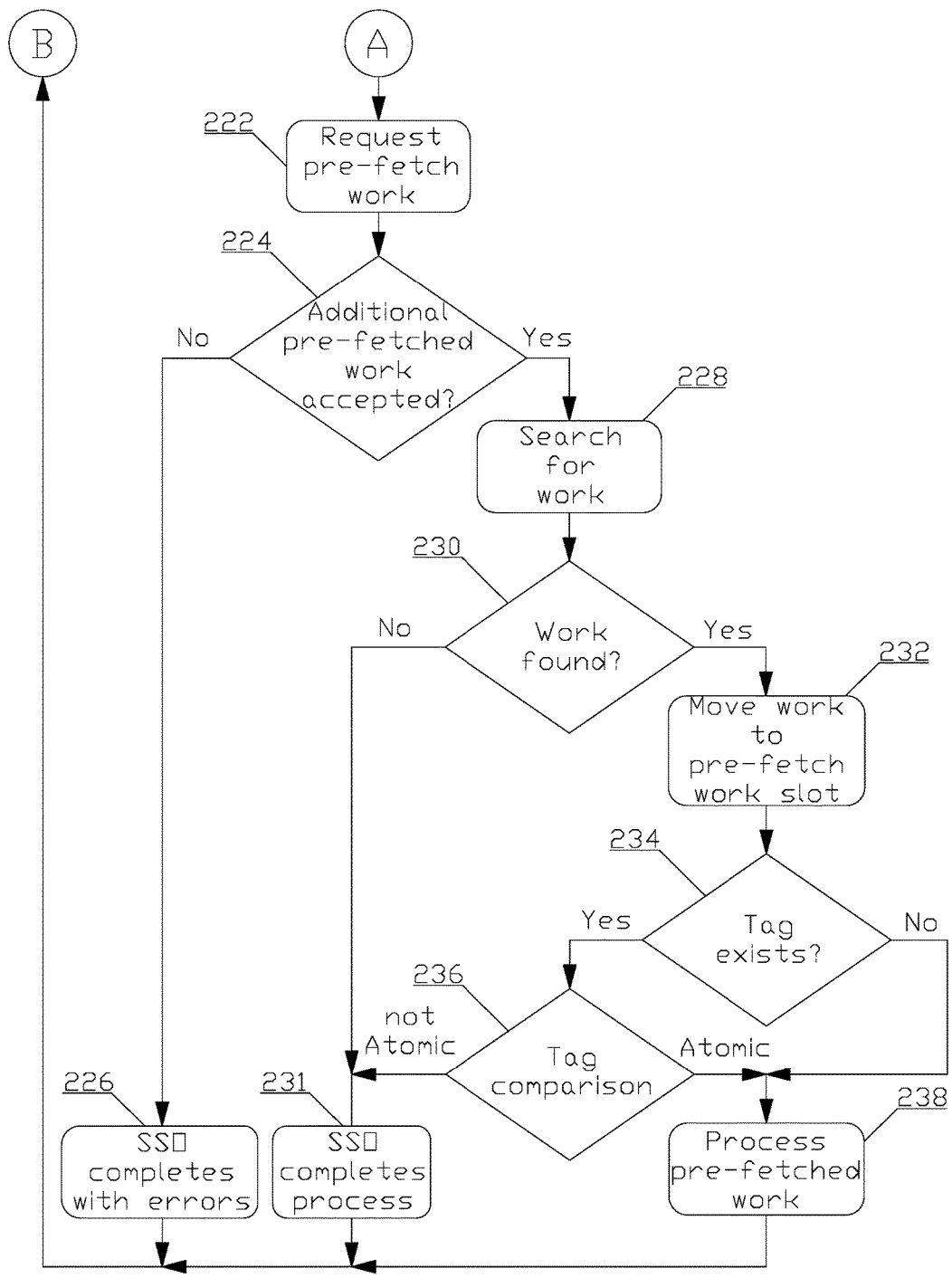
FIG. 2b depicts a second part of the flow chart enabling the process of pre-fetching work for processor cores in the network processor in accordance with the aspect of this disclosure.

Reference is made to FIG. 2, depicting a flow chart enabling the process of pre-fetching and processing work for processor cores in a network processor in accordance with an aspect of this disclosure. To clarify the relationship between certain elements of a conceptual structure and information flow among the elements of the structure enabling the process of pre-fetching and processing work for processor cores in a network processor depicted in FIG. 1, in the FIG. 2 description the references to structural elements of FIG. 1 are in parenthesis.

In step 202, a software entity executing on one of the processor cores (114) is ready to obtain work to process. The software entity executing on, e.g., the processor core (114_1) issues a GET_WORK requesting work from the SSO unit (116) via the associated work-slot structure (126_1). As disclosed supra, the work request indicates one or more groups associated with the processor core (114_1); consequently, only those groups need to be arbitrated among. In an aspect, the GET_WORK request is initiated by a load instruction to an input/output (I/O) address. In another aspect, the GET_WORK request is initiated by a store instruction and returned into a memory location specified by the processor core (114_1). The process continues in step 204. In step 204, the SSO unit (116) determines whether a pre-fetched work is ready for the processor core (114_1) by determining whether all the pre-fetched work-slots (121_1_2) comprise pre-fetched work. In an aspect, the SSO unit (116) examines content of all the pre-fetched work-slots (126_1_2). In another aspect, the SSO unit (116) examines for all the pre-fetched work-slots (126_1_2) an associated bit indicating whether a particular pre-fetched work-slot (126_1_2) is empty or not empty. When the determination is affirmative, i.e., none of the pre-fetched work-slot (126_1_2) is not empty, thus comprising the pre-fetched work, the processing continues in step 206; otherwise, the processing continues in step 208.

In step 206, the SSO unit (116) provides the pre-fetched work and when a tag and a tag-type associated with the pre-fetched work exists also the tag and the tag-type from the pre-fetched work-slot (126_1_2) to the work-slot (126_1_1), and deletes the pre-fetched work and when a tag and a tag-type associated with the pre-fetched work exists also the tag and the tag-type from the pre-fetched work-slot (126_1_2). The processing continues in step 216.

In step 216, the work-slot (126_1_1) provides the work to the processor. In an aspect, providing corresponds to the load instruction to an input/output (I/O) address.

In step 208, the arbiter (122) searches for work by determining whether any of the groups (120) associated with the processor core (114_1) have work in the admission queue (121) and may thus bid, i.e., participate in an arbitration. The get-work arbiter (122) arbitrates among only the groups (120) that have work in the admission queue (120) to select one group (120), from which work will be provided to the work-slot (126_1_1) and, eventually, to the software entity executing the processor core (114_1). A person of ordinary skills in the art will understand that any arbitration employed by the arbiter (122) known in the art may be used, e.g., a round-robin process. A novel arbitration that may be employed by the arbiter (122) is disclosed in a co-pending application Ser. No. 14/171,108, filed on Feb. 3, 2014, by Wilson P. Snyder II, et al., entitled A METHOD AND AN APPARATUS FOR WORK REQUEST ARBITRATION IN A NETWORK PROCESSOR. The processing continues in step 210.

In step 210, the SSO unit (116) determines whether the arbiter (122) found work for the processor core (114_1). When the determination is affirmative, the processing continues in step 212; otherwise, the processing continues in step 214.

In step 212, the arbiter (122) via the SSO unit (116) provides the found work and when a tag and a tag-type associated with the found work exists also the tag and the tag-type to the work-slot (126_1_1). The processing continues in step 216.

In step 214, the SSO unit (116) provides an indicator that no work has been found to the processor core (114_1). In an aspect where the load instruction to an input/output (I/O) address was used to GET_WORK, a specific data value indicating no-work are returned to the load instruction; otherwise, a flag is set, which the processor core (114_1) may read at a later time. The processing continues in step 218.

In step 218, the software entity executing on the processor core (114_1), determines whether a work has been provided. When the determination is negative, the software entity may enter a low power mode, carry-out non-work related processing, or may issue another GET_WORK request as disclosed in step 202. The non-work related processing comprises any processing not handled via the SSO unit (116). By means of an example, such non-work may comprise user processes, kernel processes, or other processes known to a person of ordinary skills in the art. When the determination is affirmative, the processing continues in step 220.

In step 220, the software entity executing on the processor core (114_1) processes the work. This usually involves using the work in the work-slot (126_1_1) as a pointer to a work-queue entry stored in a cache (108) and/or a memory (112). The SSO unit (116) determines a range of addresses starting at the pointer to be dereferenced and read from the data structure stored in the cache (108) or loaded from the memory (112) into the cache (108).

When the work-queue entry is being accessed for the first time, reading the work-queue entry is slow due to the fact that the cache (108) does not yet contain the instructions and/or the data, and accessing the memory (112) is slow because the memory (112) may be physically distant from the network processor (100). However, pre-fetching increases the probability that the dereferenced range of addresses indicates that the work-queue entry is already in the cache (108), which yields faster access than memory (112) as disclosed supra. The processing continues in step 222.

In step 222, to accelerate next work, the software entity executing on the processor core (114_1) issues a PRE-FETCH_WORK, requesting work to be pre-fetched to the SSO unit (116) via the associated work-slot structure (126_1). As with the GET_WORK, the processor core may also be a requestor. The PRE-FETCH_WORK request may be issued before the currently processed work is finished. In an aspect, the PRE-FETCH_WORK request is a store instruction to an I/O address. While the pre-fetch process disclosed in the following steps 224-238 is being carried out by the SSO unit (116), the software entity executing at the processor core (114_1) may carry out previous work, and/or other processes, e.g., process non-work related tasks, as disclosed supra; therefore, improving efficiency of the network processor (100).

If the software entity executing at the processor core (114_1) finishes these other processes before the SSO unit (116) completes the pre-fetch process, the software entity may issue another GET_WORK request as disclosed in step 202 supra. The requested work and the requested pre-fetch work are handled by the SSO unit (116) as disclosed in the flow chart and related text. The processing continues in step 224.

In step 224, the SSO unit (116) determines whether additional work may be accepted, therefore, pre-fetched for the processor core (114_1) by determining whether all the pre-fetched work-slots (121_1_2) comprise pre-fetched work. In an aspect, the SSO unit (116) examines content of all the pre-fetched work-slots (126_1_2). In another aspect, the SSO unit (116) examines for all the pre-fetched work-slots (126_1_2) an associated bit indicating whether a particular pre-fetched work-slot (126_1_2) is empty or not empty. When the determination is affirmative, the processing continues in step 226; otherwise, the processing continues in step 228.

In step 226, the SSO unit (116) completes the current process. In another aspect, the SSO unit (116) further generates an error interrupt. The interrupt is signaled to a software entity at the network processor (100), which logs the error to indicate a programming flaw. In either aspect, the processing continues in step 202.

In step 228, the arbiter (122) searches for work by the same process as disclosed in step 208 supra. The processing continues in step 230.

In step 230, the SSO unit (116) determines whether the arbiter (122) found work for the processor core (114_1). When the determination is negative, the processing continues in step 231 otherwise, the processing continues in step 232.

In step 231, the SSO unit (116) completes the current process. The processing continues in step 202.

In step 232, the arbiter (122) via the SSO unit (116) provides the found work to the pre-fetch work-slot (126_1_2). In an aspect, the pre-fetch work may comprise a "tag". The processing continues in step 234.

In step 234, the SSO unit (116) determines whether a tag associated with the found work exists. When the determination is affirmative, the processing continues in step 236; otherwise, the processing continues in step 238.

In step 236, the SSO unit (116) compares the tag of the found work against a tag for another work scheduled for the same processor core (114_1). When the comparison indicates that the pre-fetched work is atomic or ordered with respect to the another work, the processing continues in step 238; otherwise, the processing continues in step 231.

In step 238, when all the work ahead of the pre-fetched work has been processed, the software entity executing on the processor core (114_1) processes the work. The SSO unit (116) provides the pre-fetched work and when a tag and a tag-type associated with the pre-fetched work exists also the tag and the tag-type from the pre-fetched work-slot (126_1_2) to the work-slot (126_1_1), and deletes the pre-fetched work and when a tag and a tag-type associated with the pre-fetched work exists also the tag and the tag-type from the pre-fetched work-slot (126_1_2). The SSO unit (116) determines a range of addresses starting at the pointer to be derefernced and read from the data structure stored in the cache (108) or loaded from the memory (112) into the cache (108).

In an aspect, the range of addresses are physical addresses; in another aspect, the range of addresses are a virtual memory addresses which is translated using the virtual memory context of the software entity which requested the GET_WORK or the PRE-FETCH_WORK. This happens without the processor core (114_1) being aware of the pre-fetching. In an aspect the processor's PRE-FETCH_WORK can selectively enable this pre-fetching. The processing continues in step 202.

The various aspects of this disclosure are provided to enable a person having ordinary skill in the art to practice the present invention. Various modifications to these aspects will be readily apparent to persons of ordinary skill in the art, and the concepts disclosed therein may be applied to other aspects without departing from the spirit or scope of the invention. Thus, the present invention is not intended to be limited to the aspects shown herein but is to be accorded the widest scope consistent with the principles and novel features disclosed herein.

Therefore, by means of an example a person having ordinary skill in the art will understand, that the flow chart is not exhaustive because certain steps may be added or be unnecessary and/or may be carried out in parallel based on a particular implementation.

All structural and functional equivalents to the various illustrative logical blocks, modules, circuits, and algorithm steps described in connection with the various aspects described throughout this disclosure that are known or later come to be known to those of ordinary skill in the art are expressly incorporated herein by reference and are intended to be encompassed by the claims. Such illustrative logical blocks, modules, circuits, and algorithm steps may be implemented as electronic hardware, computer software, or combinations of both.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for pre-fetching and processing work for processor cores in a network processor, comprising:
   requesting work pre-fetch by a requestor comprising one of the processor cores executing a software entity;
   determining that work may be pre-fetched for processing by the requestor;
   searching for work by determining whether any of a plurality of groups associated with the requestor have work;
   pre-fetching the work from one of the plurality of groups into one of one or more pre-fetch work-slots associated with the requestor when the work is found;
   determining whether the pre-fetched work comprises a tag comprising metadata for the work;
   comparing the tag with a tag of another work scheduled for the same requestor when the pre-fetched work comprises the tag;
   processing the pre-fetched work when the comparing indicates that the pre-fetched work is atomic or ordered or when the pre-fetched work does not comprise the tag; and
   requesting another work pre-fetch when the comparing indicates that the pre-fetched work is not atomic or ordered.

2. The method as claimed in claim 1, wherein the requesting work pre-fetch by the requestor comprises:
   requesting work pre-fetch before a currently processed work is finished.

3. The method as claimed in claim 1, wherein the requesting work pre-fetch by the requestor comprises:
   requesting work pre-fetch by the one of the processor cores.

4. The method as claimed in claim 1, wherein the requesting work pre-fetch by the requestor comprises:
   requesting work pre-fetch by a software entity executing on the one of the processor cores.

5. The method as claimed in claim 1, wherein the determining that work may be pre-fetched for processing by the requestor comprises:
   determining that at least one of the one or more pre-fetched work-slots associated with the requestor does not comprise work.

6. The method as claimed in claim 1, wherein processing the pre-fetched work comprises:
   providing the pre-fetched work from the one pre-fetch work-slot to a second pre-fetch work-slot;
   deleting the pre-fetched work from the one pre-fetch work-slot.

7. The method as claimed in claim 1, wherein the processing the pre-fetched work further comprises:
   processing the pre-fetched work when all work ahead of the pre-fetched work has been processed.

8. An apparatus for pre-fetching and processing work for processor cores in a network processor, comprising:
   a requestor comprising a processor core configured to request work pre-fetch from a schedule, synchronize, and order unit;
   the schedule, synchronize, and order unit configured to
   determine that work may be pre-fetched for processing by the requestor, and
   pre-fetch work found by an arbiter into one of one or more pre-fetch work-slots associated with the requestor;
   determine whether the pre-fetched work comprises a tag comprising metadata for the work;
   compare the tag with a tag of another work scheduled for the same requestor when the pre-fetched work comprises the tag;
   process the pre-fetched work when the comparison indicates that the pre-fetched work is atomic or ordered or when the pre-fetched work does not comprise the tag; and
   request another work pre-fetch when the comparison indicates that the pre-fetched work is not atomic or ordered; and
   the arbiter configured to
   search for work by determining whether any of a plurality of groups associated with the requestor have work when the work may be pre-fetched for the requestor.

9. The apparatus as claimed in claim 8, wherein the requestor is further configured to:
   request work pre-fetch before a currently processed work is finished.

10. The apparatus as claimed in claim 8, wherein the requestor comprises a software entity executing on the processor core.

11. The apparatus as claimed in claim 8, wherein the schedule, synchronize, and order unit determines that work may be pre-fetched for processing by the requestor by being configured to:
   determine that at least one of the one or more pre-fetched work-slots associated with the requestor does not comprise work.

12. The apparatus as claimed in claim 8, wherein the schedule, synchronize, and order unit is configured to processes the pre-fetched work by being configured to:
   provide the pre-fetched work from the one pre-fetch work-slot to a second pre-fetch work-slot; and
   delete the pre-fetched work from the one pre-fetch work-slot.

13. The apparatus as claimed in claim 8, wherein the schedule, synchronize, and order unit is configured to the processes the provided pre-fetched work when all work ahead of the pre-fetched work has been processed.

* * * * *